A. C. WEBSTER.
PAINT POT.
APPLICATION FILED JAN. 9, 1915.
1,157,475.
Patented Oct. 19, 1915.
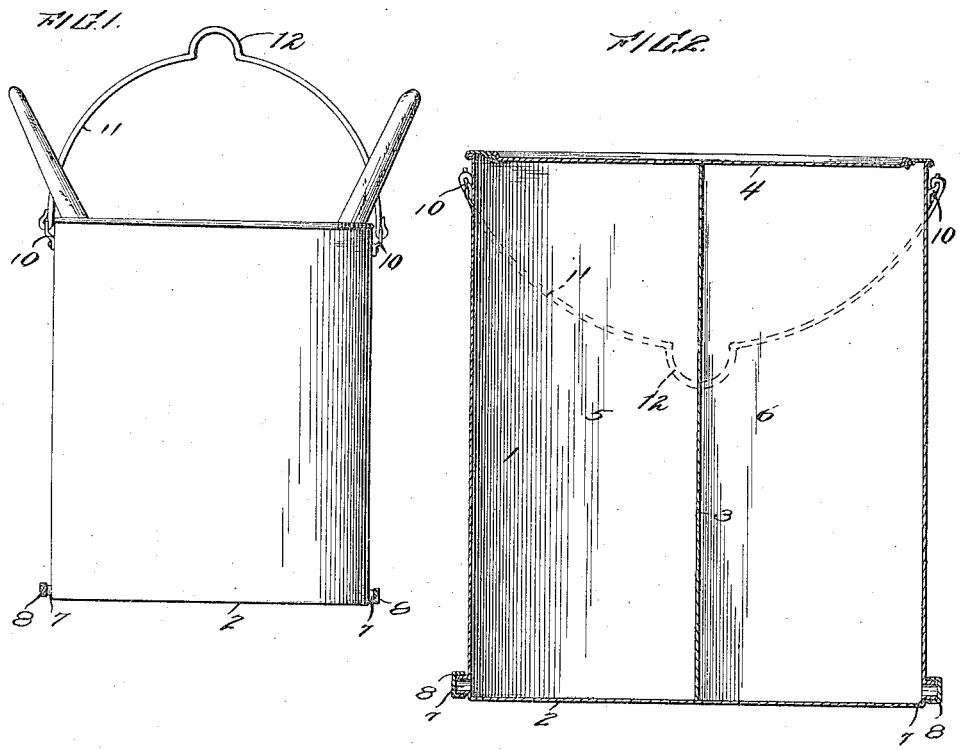
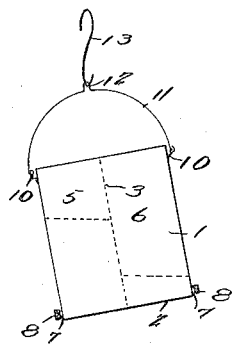
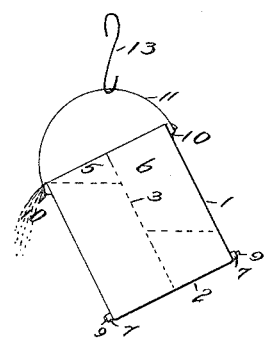
Witnesses:
R. S. Trogner.
N. L. Collamer.
Inventor:
Arthur C. Webster.
By Mason Fenwick & Lawrence,
Attorneys.

UNITED STATES PATENT OFFICE.

ARTHUR C. WEBSTER, OF PECKVILLE, PENNSYLVANIA.

PAINT-POT.

1,157,475.  Specification of Letters Patent.  Patented Oct. 19, 1915.

Application filed January 9, 1915.  Serial No. 1,409.

*To all whom it may concern:*

Be it known that I, ARTHUR C. WEBSTER, citizen of the United States, residing at Peckville, in the county of Lackawanna and State of Pennsylvania, have invented certain new and useful Improvements in Paint-Pots; and I do hereby declare the following to be a full, clear, and exact description of the invention, such as will enable others skilled in the art to which it appertains to make and use the same.

This invention relates to metallic shipping and storing vessels, and more especially to buckets in the form of cans because they originally have closed tops; and the object of the same is to produce an improved paint pot divided across its center by an upright partition so that it may hold two colors of paint, each compartment having an individual outlet for occasional use. This object is accomplished by constructing the paint pot in the manner hereinafter more fully described and claimed, and as shown in the drawings wherein:—

Figure 1 is a side view of this pot ready for use, showing the handles of two brushes sticking out of its compartments. Fig. 2 is an enlarged vertical sectional view of the paint pot with its cover in place, the handle being here indicated in dotted lines behind. Figs. 3 and 4 are diagrams which will be hereinafter referred to.

While I will describe and really intend this paint pot to be made of metal, and prefer the use of the same as being the cheapest and strongest, I do not wish to be limited thereto because the material of which it is constructed is unimportant to the essential features of the invention. Also I prefer that the general shape of the pot shall be cylindrical, and its depth a little greater than its diameter so that it shall conform in general contour with the size and shape of pots as ordinarily employed by house painters and the like. These men are often called upon to ascend a ladder or climb onto a scaffolding to paint a house, for instance, where the body is to be painted in one color and the trimmings in another; and it is their usual custom to take two pots of paint with them. One obvious purpose of the present invention is to avoid the necessity of carrying two pots of paint up the ladder, because one compartment in this improved paint pot may be filled with standard color for the body of the house, and the other with the proper color for the trimmings. This is but one of the many uses to which the invention can be put if it is employed for paint, but I do not wish to be limited to the general or specific uses of the invention.

Coming now to the details of construction, the pot itself is shown as having a cylindrical body wall 1 closed at its lower end by a flat bottom 2 which is soldered or crimped to the body or connected therewith in any suitable manner. Within the pot is an upstanding transverse partition 3 subdividing its interior into two semi-circular compartments which preferably extend for the full depth of the body, the upper edge of the partition rising to or nearly to a line flush with the upper edge of the wall 1. As shown in Fig. 2, the pot is initially covered with a closure 4 of any suitable type, and the periphery of the closure may be forced into or connected with the upper edge of the wall 1, while its center overlies the upper end of the partition rather closely. This is for the purpose of preventing the admixture or commingling of the two colors of paint within the compartments 5 and 6 produced by the partition, in case the pot is used as a can for the shipment and sale of two colors to the consumer. Outlets are formed at the bottom of the two compartments, and these are shown in Fig. 1 as nozzles 7 closed by screw caps 8, and in Fig. 4 as tubular outlets or nozzles closed by plugs 9. I do not wish to be limited in this respect, but I consider it essential that the outlets shall open from the lowest points in the two compartments 5 and 6, directly opposite to each other, and on a line at right-angles to the plane of the partition. The obvious purpose is to permit the user to open one outlet and pour out the contents from one compartment, without necessarily emptying the contents from the other.

While any suitable means may be employed as a handle for carrying this pot from point to point, I prefer to use the ordinary ears 10 which are attached to the exterior of the wall 1 at points directly above the outlets as shown, and connect these ears by means of a bail 11 which is made of stout wire and given such a curvature that it will fall over either side of the pot as indicated in dotted lines in Fig. 2. Thus the bail passes out of the way while the top of the pot is closed by the cover and the device is therefore a can, and a number of such cans could be stored end on end. To use the device as a pot, it is obviously necessary only to remove the cover and to raise the bail, inserting a brush in each compartment as indicated in the drawings. In the center of its length about over the upper edge of the partition 3 the wire constituting the bail 11 is given a little offset or crimp as at 12 so that when this pot is hung on the ordinary pot hook 13 it may not accidentally slip far to one side as shown in Fig. 4 and spill the paint, because the pot hook will fall into the offset 12 and the center of gravity of the heaviest compartment will remain beneath the lower end of the pot hook which is the point of support. This feature adds an element of reliability to the device without adding to its expense.

What is claimed as new is:

In a paint pot, the combination with a cylindrical body having a flat bottom, a transverse vertical partition across the center of said body and rising from its bottom to a point nearly flush with the upper edge of said body so as to divide the latter into separate compartments, and individual outlets from the lowest portions of said compartments; of a cover removably closing the upper end of the body and resting on the upper edge of the partition, ears on the exterior of said body at points on a line at right angles to the plane of said partition, and a wire bail connecting said ears and adapted to pass the edge of the cover, said bail being curved and having an offset at its mid-length, for the purpose set forth.

In testimony whereof I affix my signature in presence of two witnesses.

ARTHUR C. WEBSTER.

Witnesses:
 LOUIS D. PALMER,
 JOSEPH F. GILROY.

Copies of this patent may be obtained for five cents each, by addressing the "Commissioner of Patents, Washington, D. C."